United States Patent [19]

Fretwell

[11] 3,716,672

[45] Feb. 13, 1973

[54] MODEM CBS/CBT INTERFACE

[75] Inventor: Richard D. Fretwell, Columbus, Ohio

[73] Assignee: Design Elements, Inc.

[22] Filed: Aug. 9, 1971

[21] Appl. No.: 170,116

[52] U.S. Cl. ................................179/2 DP, 178/66 R

[51] Int. Cl. ............................................H04m 11/06

[58] Field of Search......179/2 DP, 3, 4; 178/58, 66 R

[56] References Cited

UNITED STATES PATENTS

| | | | |
|---|---|---|---|
| 3,597,546 | 8/1971 | Zehr | 179/2 DP |
| 3,655,915 | 4/1972 | Liberman | 179/2 DP |
| 3,663,757 | 5/1972 | Cassidy | 179/2 DP |
| 3,684,832 | 8/1972 | Marguth | 179/2 DP |

OTHER PUBLICATIONS

Data Couplers CBS and CBT for Automatic Terminals, Bell Labs Technical Reference, Aug. 1970

*Primary Examiner*—Kathleen H. Claffy
*Assistant Examiner*—Thomas D'Amico
*Attorney*—Anthony D. Cennamo et al.

[57] ABSTRACT

A logic interface circuit for providing appropriate on hook and off hook output states to the QH-DA terminal of either a CBS or CBT type telephone data link system. The appropriate output occurs in response to the command of the modem control logic without the necessity of switching or adapting the modem circuit during installation to the CBS or CBT system in which it is installed.

9 Claims, 4 Drawing Figures

INVENTOR
RICHARD D. FRETWELL
BY
Cennamo Kremblas & Foster
ATTORNEYS

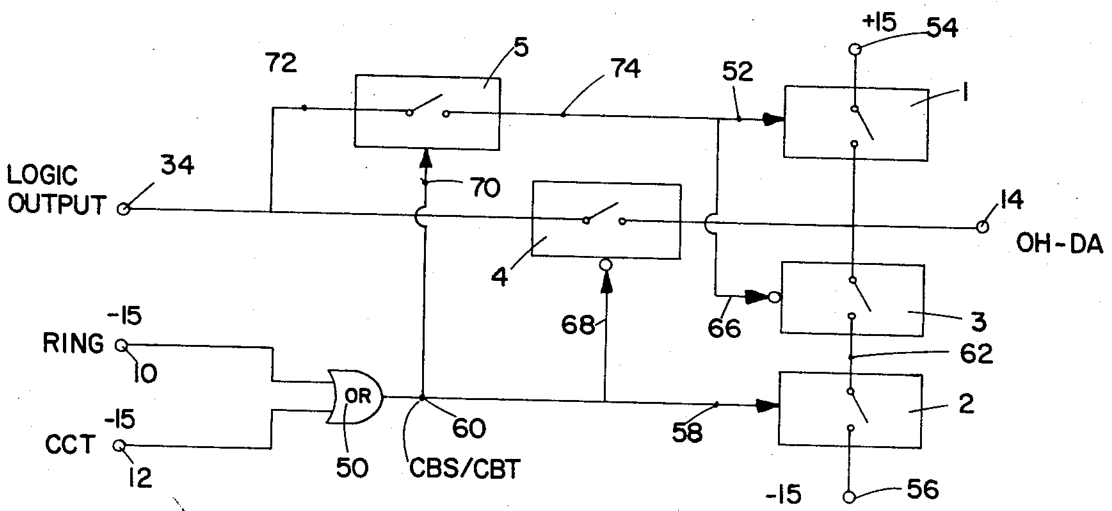

FIG. 2

| INPUTS | | | OUTPUT | DESCRIPTION |
|---|---|---|---|---|
| R Ring | CCT | Modem Logic Output 0-on hook (float) 1-off hook (ground) | OH-DA | |
| -15v. | -15v. | 0 | -15v. | Steady State on hook-no activity |
| +15 | -15 | 0 | -15 | Ring but instructed not to answer |
| +15 | -15 | 1 | +15 | Ring and answer |
| -15 | +15 | 1 | +15 | on line for data transmission |
| -15 | +15 | 0 | -15 | on line-instruct to go off line |
| -15 | -15 | 1 | | non-occurring |
| +15 | +15 | 1 | | " " |
| +15 | +15 | 0 | | " " |
| float | float | 0 | float | Steady State on hook-no activity |
| ground | float | 0 | float | Ring but instructed not to answer |
| ground | float | 1 | ground | Ring and answer |
| float | ground | 1 | ground | on line for data transmission |
| float | ground | 0 | float | on line instructed to go off |
| float | float | 1 | | non-occurring |
| ground | ground | 1 | | " " |
| ground | ground | 0 | | " " |

(The first eight rows are bracketed CBS; the last eight rows are bracketed CBT.)

FIG. 3

INVENTOR.
RICHARD D. FRETWELL
BY
Cennamo Kremblas & Foster
ATTORNEYS

INVENTOR.
RICHARD D. FRETWELL
BY
Connamo Kremblas & Foster
ATTORNEYS

MODEM CBS/CBT INTERFACE

BACKGROUND OF THE INVENTION

The present invention relates generally to data terminal equipment and more particular relates to a logic circuit for interfacing a modem controlling logic circuit to either a CBS or CBT telephone data system. The CBS and CBT telephone data system is described in the Bell System Data Communication Technical Reference for Data Couplers CBS and CBT for Automatic Terminals, August 1970.

Computer data and other communications are often transmitted over telephone lines, micro-wave links, or other systems by means of frequency shift modulation. The data bits are transmitted in the form of mark and space pulses, the mark being designated by one frequency, the space being designated by another. Data pulses, both to and from a terminal are demodulated and modulated respectively by a modem circuit. An input-output typewriter, computer storage device, or other machine is connected to the modem for receiving demodulated incoming data and for sending outgoing data.

An advanced modem is advantageously provided with control logic circuitry for monitoring alarm conditions and for permitting either manual operation or automatic operation of the terminal. In automatic operation, the terminal equipment would, upon receiving a call from remote equipment, automatically answer the call, monitor the transmission conditions, initiate the sending and receiving of data and automatically discontinue the trans-mission under the appropriate circumstances.

Telephone data linking systems include the CBS system and the CBT system. The CBT system is primarily a relay contact opening and closing system. The CBS system is basically a voltage level shifting system. Thus, for example, in a CBT system, a ring will be indicated at the R terminal of a junction box by the closing of normally open relay contacts. The CCT terminal, or coupler cut through terminal, used by the telephone company for controlling the timing of data transmission to avoid transmission while its equipment is switching, similarly provides for the closing of a normally open pair of relay contacts when data transmission is permissible.

However, at the terminal R in the junction box of the CBS system, the non-ring state is indicated by a −15 volt level which switches to a +15 volt level for a ring condition. The CCT terminal similarly switches from it normal −15 volt level to a +15 volt level to indicate that transmission is permissible.

The junction box for both the CBS and CBT systems includes an OH-DA terminal to which the modem control logic must apply a signal to indicate whether the equipment is connected on the telephone line or off the telephone line. In the CBT system, the on line or off hook state is represented by the closing of a pair of relay contacts, connecting the OH-DA terminal to ground. See Bell System Data Communication Technical Reference for Data Access Arrangement for Automatic Originating and Answering Terminals, July 1969. The on hook or off line condition is represented by an opening of the same relay contacts and is equivalent the presence of an extremely high impedance between the OH-DA terminal and ground.

However, in the CBS system, the off hook or on line condition is represented by a +15 volt level applied to the OH-DA terminal and the on hook-off line condition is represented by the application of a −15 volt level to the OH-DA terminal.

Thus, in summary, the CBT phone system uses a relay contact opening and closing logic at its ring terminal, CCT terminal and its OH-DA terminal. The CBS system utilizes a ±15 volt voltage level logic at the corresponding terminals.

There is therefore a need for a modem logic circuit which can be connected to either the CBS or the CBT system without requiring any modification, adjustment or reconstruction of the circuitry. That is, it is desirable that the modem logic have a standardized circuit with terminals which may be connected to the ring terminal, the CCT terminal and the OH-DA terminal of the junction box without any regard to whether the system in which the modem is being connected is CBS or CBT.

SUMMARY OF THE INVENTION

Accordingly, the invention involves a CBS/CBT interface for providing appropriate on hook and off hook output conditions at a telephone OH-DA terminal in response to input conditions at three input terminals. The first input terminal is connected to a control logic output which is effectively connected to ground for an off hook condition and to a very high impedance for an on hook condition. The second input terminal is a telephone ring terminal. The third input terminal is a telephone CCT terminal. The interface is also connected to a positive supply voltage and to a negative supply voltage which are intermediately connected to ground. The interface has an "or" gate means having an input connected to the ring terminal and an input connected to the CCT terminal for providing a selected output condition in response to the presence of a negative potential at either gate means input. A first electronic switch means has its principal terminals connected between the positive supply voltage and the OH-DA terminal. A second electronic switch means has one of its principal terminals connected to the negative supply voltage and its control input terminal connected to the output of the "or" gate means for being switched into conduction by said selected output of the "or" gate means. A third electronic switch means has its principal terminals connected between the OH-DA terminal and the other principal terminal of the second electronic switch. A fourth electronic switch means has its principal terminals connected between the first input terminal and the OH-DA terminal and further has its control input terminal connected to the output of the "or" gate means for being switched into conduction by said selected output of the "or" gate means. A fifth electronic switching means has its control input terminal connected to the output of the "or" gate means for being switched into conduction by said selected output of the "or" gate means. The fifth electronic switching means also has one of its principal terminals connected to said first input terminal and has its other principal terminal connected to the control input terminal of the first electronic switch means and to the control input terminal of the second electronic switch means.

It is therefore an object of the invention to provide a logic interface circuit which can permit direct connection of modem logic circuitry in either a CBS or a CBT telephone system.

Another object of the invention is to provide such an interface which can be connected without any action being taken to adapt the modem circuitry to the particular system in which it is installed and yet have it provide the output conditions uniquely appropriate to the particular system.

Further objects and features of the invention will be apparent from the following specification and claims when considered in connection with the accompanying drawings illustrating the preferred embodiment of the invention.

DESCRIPTION OF THE DRAWINGS

FIG. 2 is a block diagram illustrating the preferred embodiment of the invention.

FIG. 3 is a truth table describing the operation of the preferred embodiment of the invention.

Figure 1:
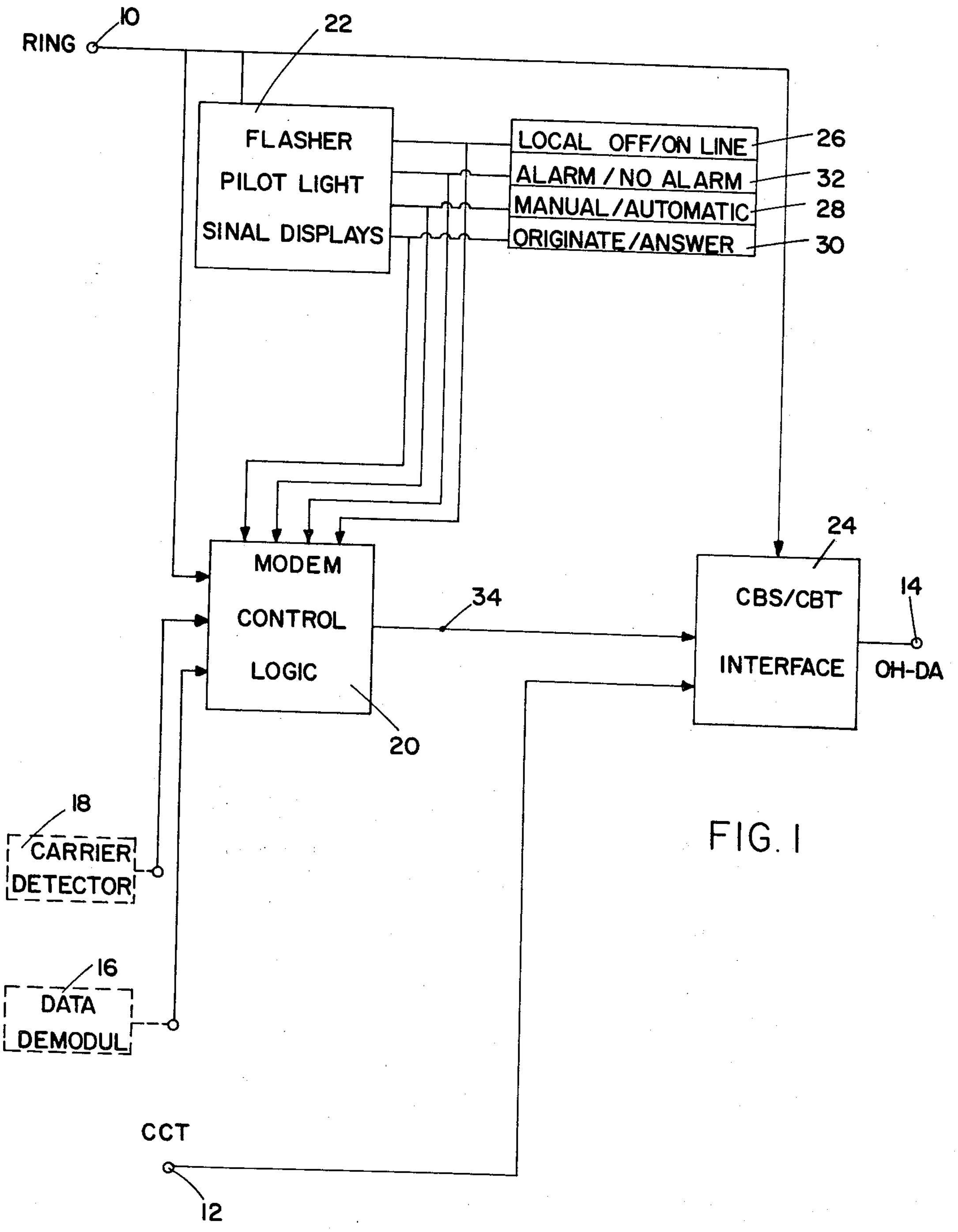
FIG. 1 is a block diagram of a portion of a modem circuit which includes as a component thereof an embodiment of the invention.

In describing the preferred embodiment of the invention illustrated in the drawings, specific terminology will be resorted to for the sake of clarity. However, it is not intended to be limited to the specific terms so selected and it is to be understood that each specific term includes all technical equivalents which operate in a similar manner to accomplish a similar purpose.

DETAILED DESCRIPTION

FIG. 1 illustrates a portion of a modem circuit connected to the ring terminal 10, CCT terminal 12, and OH-DA terminal 14 of a telephone data junction. The modem makes other connections with the telephone junction not illustrated and has a data demodulator 16 and a carrier detector 18 illustrated in phantom.

The outputs from the demodulator 16 and the carrier detector 18 together with any signal from the ring terminal 10 are applied to the modem control logic 20. The ring signal from the ring terminal 10 is additionally applied to a flasher, pilot light and signal display circuitry 22 and to the CBS/CBT interface 24 embodying the present invention.

The mode control derived from various manual selectors and automatic monitoring sensors are applied to the signal display circuitry 22 and similarly to the modem control logic circuitry 20. The three manual selection controls permit selection of the mode of operation for the modem. The manual control 26 permits the modem to be switched either to local off, meaning that the entire terminal unit is rendered off and inoperative, or to on line, meaning that the terminal unit and its modem are operative and are connected to the telephone line for operation as necessary.

The selection control 28 switches the modem either to manual operation, whereby transmission or receipt of data is manually initiated, or to automatic, whereby the modem automatically answers a call from a remote location and automatically returns data to that remote location.

The selection control 30 permits switching of the modem to its originate mode wherein a data transmission is originated at the terminal or to its answer mode wherein data transmission is originated at a remote terminal and received by the modem under consideration.

Finally, an automatic monitoring control 32 indicates whether alarm conditions exist such as the lack of paper in the suitable print-out machine.

The CCT terminal 12 as well as the output terminal 34 of the modem control logic 20 are connected to the input of the CBS/CBT interface 24. The logic of the modem control logic circuit 20 is such that its output terminal 34 is connected to ground in the off hook state and is connected to a very high impedance (i.e. floating) for the on hook or off line state. This on hook/off hook signal at the output terminal 34 must be translated to the proper on hook and off hook signal at the OH-DA terminal 14. If the modem is connected in a CBT system, the on hook-off line signal must be a very high impedance and the off hook-on line signal must be the connection of the terminal OH-DA 14 to ground. However, with the CBS system, the on Hook/off hook signal at the output terminal 34 must be translated by the CBS/CBT interface 24 to a −15 volts to represent the on hook-off line condition and to a +15 volts to represent the off hook-on line condition appropriate for the CBS system.

The purposes of the CBS/CBT interface 24 is to provide this translation in a standard circuit which can be connected either to a CBS or CBT system without requiring any circuit modification, adjustment or switching.

FIG. 2 illustrates a block diagram of the CBS/CBT interface 24 illustrated in FIG. 1. FIG. 3 is a truth table defining the operation of the interface illustrated in FIG. 2.

The circuit of FIG. 2 has an "or" gate means 50 having one input connected to the ring terminal 10 and the other input connected to the CCT terminal 12. The "or" gate means 50 provides a selected voltage level output condition in response to the presence of a negative potential at either of its inputs. In effect, a negative voltage at one input will always be present for a CBS system and never will be present for a CBT system. Therefore, the existence of the selected output condition at the "or" gate indicates that the modem is connected to a CBS system. The absence of the selected output indicates that the modem is connected to a CBT system.

A first electronic switch means 1 has a control input terminal 52 for switching the first switch means 1 into conduction when its control input 52 is grounded. Its principal terminals are connected between the positive power supply terminal 54 and the OH-DA terminal 14.

A second electronic switch means 2 has one of its principal terminals connected to the negative power supply 56 and its control input terminal 58 connected to the output 60 of the "or" gate means 50 for being switched into conduction by said selected output of the "or" gate means 50.

A third electronic switch means 3 has its principal terminals connected between the OH-DA terminal 14 and the other principal terminal 62 of the second electronic switch means 2. The third electronic switch means 3 is switched into nonconduction when its control input terminal 66 is connected to ground. Alternatively, it is switched into conduction when its control input terminal 66 is connected to a high impedance or floating.

A fourth electronic switch means 4 has its principal terminals connected between the logic circuit output terminal 34 and the OH-DA terminal 14. Its control input terminal 68 is connected to the output of the "or" gate means 50 for being switched into conduction by the absence of said selected output of the "or" gate means 50. Thus, when a negative voltage is present at either the ring terminal 10 or the CCT terminal 12, the fourth electronic switch means 4 will be switched to nonconduction. When, however, a negative voltage is present at neither the ring terminal 10 nor the CCT terminal 12, then the fourth electronic switch means 4 will be switched to conduction.

A fifth electronic switching means 5 has its control input terminal 70 connected to the output terminal 60 of the "or" gate means 50 for being switched into conduction by said selected output of the "or" gate means 50. One of its principal terminals 72 is connected to the modem control logic output terminal 34. Its other principal terminal 74 is connected to the control input terminal 52 of the first electronic switch means 1 and to the control input terminal 66 of the third electronic switch means 3.

Referring now to the truth table of FIG. 3 in conjunction with the block diagram illustrated in FIG. 2, the operation of the preferred embodiment may be considered first when used in a CBS system. When connected in a CBS system, and existing in the steady state on hook condition with no activity occurring, the ring terminal 10 will be held at −15 volts and the CCT terminal 12 will similarly be −15 volts. With the modem logic output terminal 14 instructing an on hook condition (i.e. floating), the output at the OH-DA terminal should be −15 volts. This occurs because the output of the "or" gate means 50 is at its selected value to indicate that at least one of the "or" gate input terminals is at −15 volts. The presence of this selected output from the "or" gate means indicates that a CBS system is being used. This is true because at all times, at least one of the terminals 10 and 12 will be held at −15 volts when the interface is connected in a CBS system.

The "or" gate means selected output condition at the terminal 60 switches the second electronic switch means 2 into conduction. The third electronic switch means 3 is already in conduction since its control input terminal 66 is not grounded. In this manner, the OH-DA terminal 14 is connected through the electronic switch means 2 and 3 to the −15 volt power supply terminal 56.

If now a ring occurs, such that the ring terminal 10 switches to +15 volts, but the modem control logic instructs that the ring not be answered, then the circuit remains in the same state so that −15 volts continues on the OH-DA terminal 14.

If a ring occurs, and the modem control logic circuit 20 instructs that the ring be answered and the modem be placed on line, the logic output terminal 34 is grounded. This connects the control input terminal 52 of the first electronic switch 1 to ground through the fifth electronic switch 5 which is always in condition with the CBS system. Simultaneously, the control input terminal 66 of the third electronic switch 3 is connected to ground to bring it to nonconduction thereby disconnecting the −15 volts supply terminal 56 from the OH-DA terminal 14. The OH-DA terminal is connected to the +15 volt supply by the first switch 1 to apply +15 volts to the OH-DA terminal thereby indicating the off hook-on line condition.

When the CCT terminal 12 switches to +15 volts after the modem is on line, the circuit will remain in the same condition because the ring will remain at −15 volts thereby maintaining the identical output of the "or" gate means 50 at the output terminal 60 for all CBS operation.

If a transmission is now concluded and the modem control logic gives the instruction to go off line-on hook and thereby disconnect the modem from the phone line, it does so by reverting to its high impedance (floating) state. This change returns the circuit to the initial condition since the +15 volts on the CCT terminal 12 will have no effect on the output of the "or" gate means 50. The three remaining logically possible input conditions which will not occur in the telephone system are shown in FIG. 3.

If the CBS/CBT interface is connected in a CBT system, neither input to the "or" gate means 50 will be at a negative voltage at any time and therefore the output of the "or" gate means 50 will not be at its selected value and will thereby indicate at its output that CBT system is connected to the interface. Therefore the output of the "or" gate means 50 will maintain the second electronic switch means 2 and the fifth electronic switch means 5 in their nonconducting states. This in turn, will maintain the first electronic switch means 1 in its nonconducting state and the third electronic switch means 3 although maintained in its conducting state will have no effect because the second electronic switch means 2 is nonconducting. In addition, this will maintain the fourth electronic switch means 4 in its conducting state for all conditions when a CBT system is connected.

In this manner, the logic output control 34 is connected directly to the OH-DA terminal 14 for all CBT conditions. Thereby, the output OH-DA terminal 14 will duplicate the conditions present at the control logic output terminal 34. Therefore, the OH-DA terminal will be grounded for off hook-on line conditions and will be connected to a very high impedance (floating) for all on hook-off line conditions.

FIG. 3 is a schematic diagram illustrating the preferred embodiment of the invention. In this circuit the "or" gate means comprises a pair of diodes 102 and 104 having their anodes connected through a base resistance 106 to the base of a common emitter connected NPN transistor $Q_1$. The cathodes of the diodes 102 and 104 are connected to the ring terminal 10 and to the CCT terminal 12. Whenever connected in a CBS system, the negative voltage which will be present at all times at either the ring terminal 10 or the CCT terminal 12 will switch the transistor $Q_1$ into conduction bringing its collector nearly to ground potential. When connected in a CBT system, neither the terminal ring 10 or the CCT terminal 12 will ever be negative and therefore the transistor $Q_1$ will always be in nonconduction and its collector will be at nearly the −15 volts of the power supply terminal 56.

The first electronic switch means comprises a series connected diode 108, load resistance 110 and PNP transistor $Q_2$ having its emitter terminal connected to the +15 volts supply terminal 54 and its collector connected to the anode of the diode 108. Whenever brought into conduction, the transistor $Q_2$ effectively connects the OH-DA terminal 14 to the +15 volt supply at the terminal 54.

The third electronic switch means includes a PNP transistor $Q_3$ having its emitter connected to the cathode of the diode 108 and its base connected to the anode of the diode 108.

The second electronic switch means includes a NPN transistor $Q_4$ having its emitter connected to the negative supply terminal 56 and its collector connected to the collector of the transistor $Q_3$. The base of the transistor $Q_4$ is connected through a suitable resistance 112 to the output terminal 60 of the "or" gate means.

The fourth electronic switch means includes a series connected diode 114 and an NPN transistor $Q_5$ having its collector connected to the cathode of the diode 114. The emitter of the transistor $Q_5$ is connected to the logic control circuit output at the terminal 34 and its base is connected through a logic level shifting and inverting circuit 120 to the output terminal 60 of the "or" gate means. Whenever the "or" gate means output terminal 60 is brought near ground potential, the transistor $Q_6$ of the logic level shifting circuit 120 is brought into conduction. The conduction of the transistor $Q_6$ brings its collector near a −15 volts thereby bringing the transistor $Q_5$ into a nonconducting state. When connected in a CBT system, in which the input ring terminal 10 and the input CCT terminal 12 are always at ground potential or floating then the transistor $Q_1$ will always be nonconducting thereby bringing its collector output terminal 60 to substantially −15 volts. This in turn will bring the inverter transistor $Q_6$ to nonconduction. Its collector will therefore become substantially +15 volts thereby bringing the transistor $Q_5$ into a conducting state for all CBT operation.

The fifth electronic switch means is a field effect transistor 124 having its gate terminal 126 connected through a suitable resistance 128 to the output terminal 60 of the "or" gate means. Its source and drain terminals are connected between the control logic output terminal 34 and through a suitable resistance 130 to the base of the transistor $Q_2$ In the operation of the preferred circuit illustrated in FIG. 4 when installed in a CBS system, the output terminal 60 from the transistor $Q_1$ will always be near ground potential for reasons explained above. This is the selected output condition for this circuit which represents CBS operation. This will maintain the transistor $Q_5$ in its nonconducting state for all conditions, in the CBS system. Similarly, the nearly ground potential at the "or" gate output terminal 60 will maintain the transistor $Q_4$ in conduction and the FET transistor 124 in conduction for all CBS situations.

An off line-on hook instruction at the control logic output terminal 34 will in effect float the terminal 34 thereby rendering the transistor $Q_2$ nonconducting and permitting the transistor $Q_3$ to be conducting with its base current supplied through the resistance 140. With transistors $Q_3$ and $Q_4$ in conduction, the OH-DA terminal 14 is effectively connected to the −15 volts supply terminal 56.

A on line-off hook instruction at the control logic output 34 will bring the terminal 34 to ground potential. This will supply base current to the transistor $Q_2$ bringing it into conduction thereby connecting the OH-DA terminal 14 to the +15 volt supply terminal 54 through the forward biased diode 108. This forward biasing of the diode 108 deprives the transistor $Q_3$ of base current bringing it to a nonconducting state and disconnecting the OH-DA terminal 14 from the negative supply terminal 56.

Figure 4:
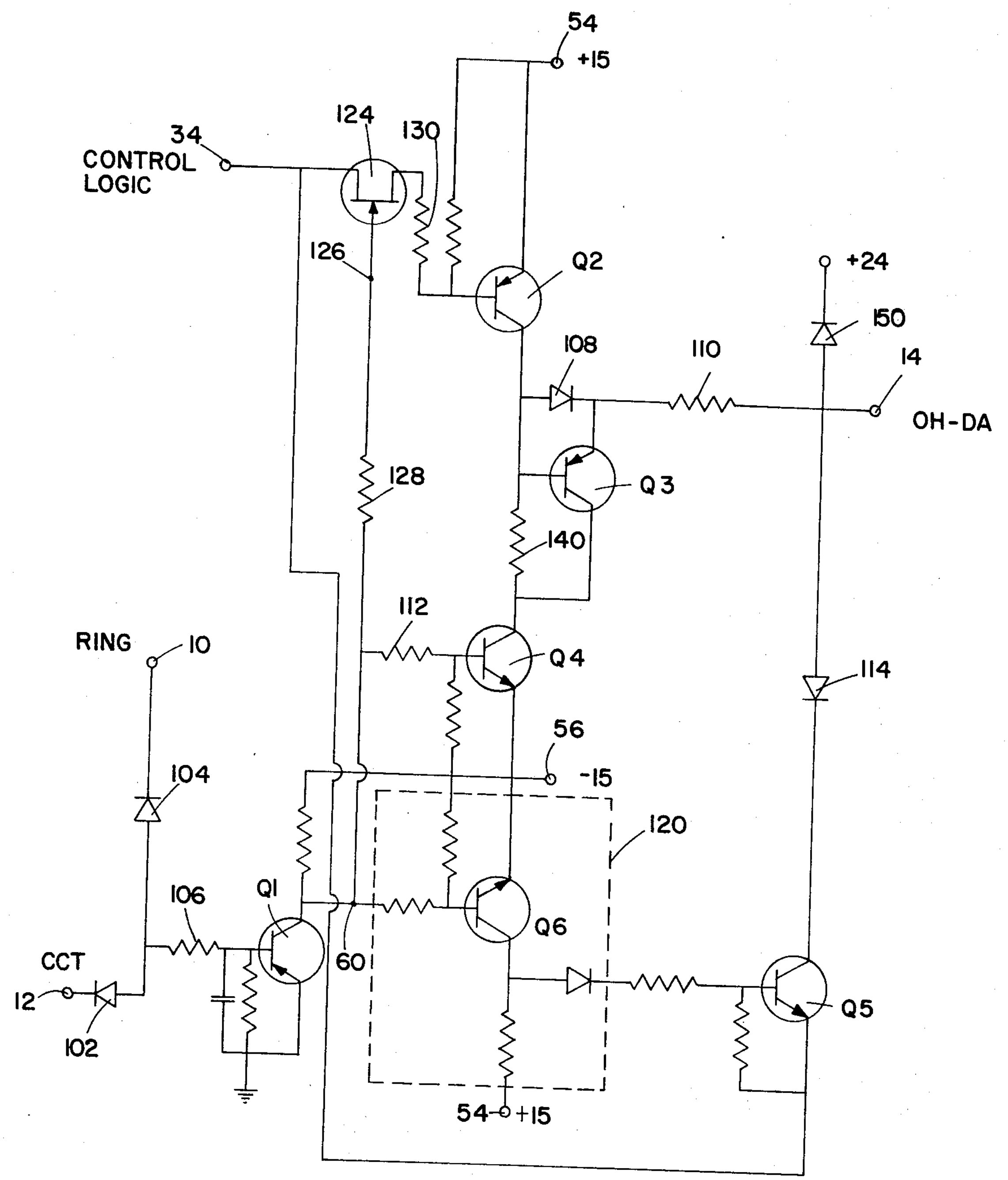
FIG. 4 is a schematic diagram of the preferred embodiment of the invention.

In the operation of the circuit of FIG. 4 in a CBT system, the "or" gate output terminal 60 will be maintained under all CBT conditions at nearly −15 volts. This, in the manner explained above, will bring the transistor $Q_5$ into conduction and simultaneously will open the FET 124 and will bring the transistor $Q_4$ into nonconduction thereby effectively disconnecting the OH-DA terminal 14 from either the +15 volt supply 54 or the −15 volt supply 56.

Now with the control logic terminal 34 essentially floating to indicate off line-on hook conditions, no collector current can be supplied to the transistor $Q_5$ and therefore the OH-DA terminal 14 will be effectively floating. When however, the control logic output terminal 34 becomes grounded from an on line-off hook instruction, the conducting transistor $Q_5$ will effectively connect the OH-DA terminal 14 to the control logic output terminal 34.

A diode 150 is connected between the OH-DA terminal 14 and a +24 volt supply for assuring that the OH-DA terminal can never under any conditions exceed 24 volts.

Therefore it can be seen that I have provided a CBS/CBT interface circuit which adapts itself to the CBS or CBT system and provides the appropriate output at the OH-DA terminal for that particular system in response to the control logic instruction. The circuit switches itself to the proper mode of operation and provides the appropriate outputs without the need of any manual switching or circuit modification.

It is to be understood that while the detailed drawings and specific examples given describe preferred embodiment of the invention, they are for the purposes of illustration only that the apparatus of the invention is not limited to the precise details and conditions disclosed and that various changes may be made therein without departing from the spirit of the invention which is defined by the following claims.

I claim:

1. A CBS/CBT interface for providing appropriate on hook and off hook output conditions at a telephone OH-DA terminal in response to input conditions at three input terminals, the first input terminal connected to a control logic output which is effectively connected to ground for an off hook instruction and to a very high impedance for an on hook instruction, the second input terminal being a ring terminal and the third input terminal being a CCT terminal, the interface also being connected to a positive power supply and to a negative power supply intermediately connected to ground, said interface comprising:

a. "or" gate means having an input connected to said ring terminal and an input connected to said CCT terminal for providing a selected output condition in response to the presence of a negative potential at a gate means input;

b. a first electronic switch means includes a control input terminal for switching said first switch means into conduction when said control input is grounded, the principal terminals of said first switch connected between said positive supply and said OH-DA terminal;

c. a second electronic switch means having one of its principal terminals connected to said negative supply and its control input terminal connected to the output of said "or" gate means for being switched into conduction by said selected output of said "or" gate means;

d. a third electronic switch means including a control input terminal and having its principal terminals connected between said OH-DA terminal and the other principal terminal of said second electronic switch means for being switched into nonconduction when its control input terminal is connected to ground;

e. a fourth electronic switch means having its principal terminals connected between said first input terminal and said OH-DA terminal and its control input terminal connected to the output of said "or" gate means for being switched into conduction by the absence of said selected output of said "or" gate means;

f. a fifth electronic switching means having its control input terminal connected to the output of said "or" gate means for being switched into conduction by said selected output of said "or" gate means, having one of its principal terminals connected to said first input terminal and its other principal terminal connected to the control input terminal of said first electronic switch means and to the control input terminal of said third electronic switch means.

2. A CBS/CBT interface according to claim 1 wherein said "or" gate means comprises a pair of diodes having interconnected anodes and having one cathode connected to said second input terminal and the other cathode connected to said third input terminal; and wherein said interconnected anodes are conductively connected to the base of a common emitter connected NPN transistor.

3. A CBS/CBT interface according to claim 1 wherein said first electronic switch means comprises a series connected diode, load resistance, and PNP transistor, its base being its control input terminal and having its emitter connected to said positive supply and its collector connected to the anode of said diode.

4. A CBS/CBT interface according to claim 3 wherein said third electronic switch means comprises a PNP transistor having its emitter connected to the cathode of said diode and its base connected to the anode of said diode; and wherein said second electronic switch means comprises a NPN transistor having its emitter connected to said negative supply, its collector connected to the collector of said third electronic switch means and its base connected to the output of said "or" gate means.

5. A CBS/CBT interface according to claim 1 wherein said fourth electronic switch means comprises a series connected diode and NPN transistor having its collector connected to the cathode of said diode, its emitter connected to said first input terminal and its base connected to the output of said "or" gate means.

6. A CBS/CBT interface according to claim 5 wherein said fourth electronic switch means includes a logic level shifting circuit connecting the base of said series connected NPN transistor to said "or" gate means output and comprising an NPN transistor having its emitter connected to said negative supply, its base connected to said "or" gate means output and its collector connected through a suitable load resistance to said positive supply, and a diode having its anode connected to the collector of said logic shifting transistor and its anode connected to the base of said series connected NPN transistor.

7. A CBS/CBT interface according to claim 1 wherein said fifth electronic switch means comprises a field effect transistor having its gate connected to the output of said "or" gate means.

8. A CBS/CBT interface according to claim 1 wherein said "or" gate means comprises a pair of diodes having interconnected anodes and having one cathode connected to said second input terminal and the other cathode connected to said third input terminal; and wherein said interconnected anodes are conductively connected to the base of a common emitter connected NPN transistor; and wherein said first electronic switch means comprises a series connected diode, load resistance, and PNP transistor, its base being its control input terminal and having its emitter connected to said positive supply and its collector connected to the anode of said diode; and wherein said third electronic switch means comprises a PNP transistor having its emitter connected to the cathode of said diode and its base connected to the anode of said diode; and wherein said second electronic switch means comprises a NPN transistor having its emitter connected to said negative supply, its collector connected to the collector of said third electronic switch means and its base connected to the output of said "or" gate means; and wherein said fourth electronic switch means comprises a series connected diode and NPN transistor having its collector connected to the cathode of said diode, its emitter connected to said first input terminal and its base connected to the output of said "or" gate means; and wherein said fourth electronic switch means includes a logic level shifting circuit connecting the base of said series connected NPN transistor to said "or" gate means output and comprising an NPN transistor having its emitter connected to said negative supply, its base connected to said "or" gate means output and its collector connected through a suitable load resistance to said positive supply, and a diode having its anode connected to the collector of said logic shifting transistor and its anode connected to the base of said series connected NPN transistor; and wherein said fifth electronic switch means comprises a field effect transistor having its gate connected to the output of said "or" gate means.

9. A CBS/CBT interface connected to a telephone junction for providing appropriate on-hook and off hook conditions at a telephone OH-DA terminal connected to its output in response to an instruction from a modem control logic circuit connected at an input terminal, said interface comprising;

a. logic means for detecting and alternatively indicating the connection thereto of a CBS and a CBT system.

b. means connected to said logic means, said input terminal and said output for applying a −15 volts to said output in response to a CBS system and a control logic instruction for on-hook;

c. means connected to said logic means, said input terminal and said output for applying a +15 volts to said output in response to a CBS systems and a control logic instruction for off hook;

d. means connected to said logic means, said input terminal and said output for substantially disconnecting said output in response to a CBT system and a control logic instruction for on hook; and e. means connected to said logic means, said input terminal and said output for connecting said output to ground in response to a CBT system and a control logic instruction for off hook.

* * * * *